United States Patent Office 2,834,652
Patented May 13, 1958

2,834,652

RECOVERY OF SELENATE VALUES CONTAINED IN SULFURIC ACID SOLUTIONS

Max L. Hollander, Plainfield, and Yurii E. Lebedeff, Metuchen, N. J., assignors to American Smelting and Refining Company, New York, N. Y., a corporation of New Jersey No Drawing. Application October 1, 1956
Serial No. 612,968

6 Claims. (Cl. 23—209)

This invention relates to a process for recovering dissolved selenate values contained in sulfuric acid solutions. More particularly, it relates to the use of thiourea in reducing such values in such solutions to elemental selenium.

Heretofore it has not been possible in commercial practice to recover the selenate values in sulfuric acid solutions. The absence of a commercial procedure for effecting such recovery has long presented the art with a difficult problem. Thus, it is advantageous to recover selenium values in selenium-bearing materials, particularly in materials variously known as slimes, sludges, anode muds and similar by-product materials from the electrolysis of impure copper, by incorporating the selenium values in such material into a molten alkali slag as an alkali metal compound of selenium. The slag is then leached with an aqueous solution, usually water, to dissolve the selenium values from the slag. Thereafter the leach solution is acidified and the latter treated with sulfur dioxide which is either added thereto, as such, or generated in situ therein to precipitate elemental selenium from the solution.

When the leach solution is acidified with large amounts of hydrochloric acid on the order of about 200 grams of HCl per liter of solution, or equivalent amounts of HCl are generated in situ in the solution for example by adding an appropriate amount of a suitable chloride such as sodium chloride to an acidified solution, the sulfur dioxide readily reduces substantially all of the selenite as well as substantially all of the selenate values in the leach solution, to elemental selenium. However, the use of hydrochloric acid in such amounts is attended by serious disadvantages. It causes excessive corrosion in conventional metal equipment such as lead or lead-lined equipment and the corrosion problem can only be avoided by the use of expensive glass or glass-lined apparatus. Moreover, an elemental selenium product is obtained which is contaminated with chlorides and which can be converted only with great difficulty and expense to a highly purified product such as rectifier grade selenium.

On the other hand, when the leach solution is acidified with sulfuric acid, little, if any, corrosion occurs when the reduction is conducted in conventional metal apparatus and the precipitated selenium product can be purified comparatively easily and cheaply to rectifier grade selenium. However, while $SO_2$ readily reduces selenite values to elemental selenium in sulfuric acid solutions, it is completely without effect in reducing selenate values. Therefore, in the past, every effort has been made to obtain sulfuric acid solutions which contain a minimum amount of selenate values. In this connection much progress has been made in methods of controlling the oxidation conditions in the molten slag to obtain a slag containing a high proportion of selenite values. Nevertheless, it has not been possible to so control the oxidation conditions in the molten slag so as to avoid the formation of selenate values. Even with the best available procedures, slags are obtained in which 3 to 5% of the total selenium values are in the form of selenates. Slags containing on the average of as much as 25% of the total selenium as selenates are not uncommon in the industry, and individual batches of slag are often obtained in which as much as 50% of the total selenium is in the selenate state. As a consequence, solutions are encountered in the industry which commonly contain 1 to 5 grams per liter and often from 0.5 to 10 grams per liter, or more, of selenium in the selenate state. In the past, these solutions have been discarded after their selenite values have been precipitated therefrom and the remaining selenate values therein were lost.

One of the objects and advantages of the invention is that it overcomes the above-mentioned difficulties with which the art has been faced. Another is that it affords an effective method of reducing selenate values in sulfuric acid solutions, to elemental selenium. Thus, in the aforementioned process for recovering selenium values in a selenium-bearing material involving incorporating such values into a molten alkali slag as an alkali metal compound of selenium, it is no longer necessary to keep the formation of selenate values in the slag to a minimum in order to avoid the loss of selenium values. A further object and advantage of the invention is that it affords a simple and effective method of recovering selenium values contained in a sulfuric acid solution in which a portion or all of such values occur therein as selenates. These and other advantages of the invention will become apparent from the following more detailed description of the invention.

Broadly, the invention comprehends recovering selenate selenium values contained in a sulfuric acid solution by reducing such values to elemental selenium in the presence in the solution of thiourea. Such acid solutions may be obtained from any source, including any source containing any selenate selenium values. The reduction of the selenates, which in the acid solution appear to be in the form of selenic acid, may be accomplished with thiourea alone or in combination with another reducing agent or agents. The use of thiourea as described herein has had no deleterious effect on apparatus fabricated of conventional metal. Consequently, the process of the invention may be conducted in such apparatus without adversely effecting corrosion therein. This is another important advantage of the invention. The term thiourea as used in the specification and in the claims is intended to include any thiourea, including substituted thioureas.

Chlorides may be present in the solution in practicing the invention. Such chlorides may be added or may be unavoidably present in the solution. Preferably, however, chlorides are not added and the solution is as free as possible of such values. In general, the selenate solutions which are encountered may unavoidably contain up to about 5 grams per liter and in most instances up to about 1 gram per liter of chlorides calculated as chlorine. When present in these amounts and especially in amounts of less than about 1 gram per liter, they do not unduly effect corrosion of conventional metal apparatus or the subsequent purification of the precipitated selenium product. If for any reason chlorides are added to the solution, it is highly desirable to maintain them below, and preferably well below, about 200 grams per liter of chlorides calculated as chlorine.

When thiourea alone is used as the reductant in the sulfuric acid solution, the amount of selenate values reduced to elemental selenium depends upon the amount of thiourea present therein in relation to the selenate values. The rate at which selenate values are reduced depends upon the solution temperature, the acid concentration and the ratio of thiourea to selenate selenium values. Any desired temperature may be used although it has been found that the rate of selenium reduction increases sharply as the solution temperature is increased above about 60° C. Preferably, the solution is maintained at a temperature above about 60° C. and most preferably in the range of about 80° C. and the solution boiling point. The solution may contain any amount of acid; however, about 10 to 200 grams or more per liter of sulfuric acid are preferred and about 40 to 200 grams per liter are most preferred.

The solution may contain any amount of selenate values in any concentration and any desired amount of thiourea may be added thereto to provide any desired concentration of the latter in the solution. However, as indicated earlier, solutions containing 0.5 to 10 grams and generally from 1 to 5 grams per liter of selenate selenium calculated as Se are most often encountered. To remove substantially all of the selenate values in a sulfuric acid solution using thiourea alone as the reductant, enough thiourea should be added to the solution to make available therein at least 2.7 grams of thiourea for each gram of selenium in the selenate state in the solution and the solution should thereafter be maintained at a desired temperature until substantially all of the selenate values are reduced to elemental selenium. Such amount of thiourea corresponds to 2.8 mols of thiourea for each mol of selenate selenium. Preferably, the solution contains 2.7 to 10 grams and, most preferably, about 3.2 to 5 grams of thiourea for each gram of selenate selenium. It will be understood that the thiourea may be consumed in reducing other values which may be present in the solution, such as for example, tellurium and other metal values, and that enough additional thiourea should be added to compensate for any such consumption. When both the solution temperature and acidity are maintained in the above preferred ranges, and especially in the most preferred ranges, the thiourea is used most efficiently. When, in addition, at least 2.7 grams, and especially 3.2 to 10 grams, of thiourea for each gram of selenate selenium are used, substantially all the selenate selenium is reduced to elemental selenium in about one to two hours.

It has been found that when thiourea alone is used as the reductant, elemental sulfur is also produced in amounts proportional to the amount of elemental selenium produced. Thus, it has been found that when substantially all of the selenate values are reduced to elemental selenium, the product contains as much as 64% by weight of sulfur. Relatively, the presence of sulfur in the product is not disadvantageous. However, its presence in such large amounts is not especially desirable and, as will be pointed out more fully hereinafter, the invention also affords a method of reducing selenate values without substantial formation of sulfur.

It has been found that reducing agents which are otherwise incapable of reducing selenate values in sulfuric acid solutions can be used in combination with thiourea to effect reduction of such values in such solutions. Among such agents, sulfur dioxide is preferred and may be added to the solution, as such, or generated in situ therein. Although any such agent may be introduced before, during or after the addition of thiourea, it preferably is added before or simultaneously with the introduction of the thiourea into the solution.

When thiourea is used in combination with sulfur dioxide, the rate at which the selenate values are reduced depends upon the solution temperature, the concentration of the acid in the solution, the ratio of thiourea to selenate selenium and, to a lesser extent, upon the rate of introduction of the sulfur dioxide into the solution. As in the case where thiourea alone is used as the reductant, any desired temperature may be used up to and including the boiling point of the solution. However, reduction rates also increase rapidly at temperatures above about 60° C., and temperatures above this temperature are preferred, with a temperature in the range of about 80° C. and the solution boiling point being most preferred. Likewise, the solution may contain any desired concentration of sulfuric acid. In general, the solution preferably contains at least about 10 grams per liter of sulfuric acid; however, acid concentrations in the range of about 40 to about 200 grams per liter or more of $H_2SO_4$ are most preferred.

In using thiourea in combination with another reducing agent, the solution may contain any amount of selenate values in any concentration, and any desired amount of the thiourea and the additional agent may be used. Although reduction of the selenate values does not occur when using the additional agent in the absence of thiourea in the solution, such reduction does proceed in the presence of thiourea in the solution. Thus, it has been found that sulfur dioxide will precipitate elemental selenium from the selenate selenium values in a sulfuric acid solution when as little as 1 gram of thiourea is present in the solution for each 30 grams of selenium in the selenate state therein. It has also been found that substantially all of the selenate values can be reduced to elemental selenium in the presence in the solution of such small amounts of thiourea when the additional reducing agent is used at least in amounts which are sufficient to reduce amounts of selenite selenium which are equivalent to the amounts of selenate values originally present in the solution.

In the preferred mode of conducting the invention using thiourea and sulfur dioxide as the reductants, it is advantageous to use less than 2.7 grams of thiourea for each gram of selenium in the selenate state in the solution. Preferably, thiourea is used in amounts corresponding to about 1 gram of thiourea for each 3 to 10 grams of selenate selenium values, especially when the initial sulfuric acid solution contains 0.5 to 10 grams or more per liter of selenate selenium values; most preferably the ratio is about 1 gram of thiourea for each 3 to 6 grams of selenate selenium, particularly in solutions containing 1 to 5 grams of selenate selenium values.

Under any given set of conditions and in apparatus of a given size and design, an increase in the rate at which the sulfur dioxide is introduced into the solution increases the rate at which the selenate values are reduced in the early stages of the reduction although the overall effect on the reduction rate is comparatively small. It will be understood that the rate of introduction of the $SO_2$ in relation to the size and shape of the apparatus, the amount of the agitation and the mode of introduction of the $SO_2$ also affect the rate at which elemental selenium is precipitated. Accordingly, the optimum mode and rate of introducing the sulfur dioxide should be determined for the particular apparatus to be used. With solutions containing about 1 to 5 grams per liter of selenate selenium, about 1 gram of thiourea for each 3 to 30 grams of selenate selenium, about 40 to 200 grams per liter of $H_2SO_4$, and at temperatures above about 60° C., $SO_2$ can be introduced into the solution at rates sufficient to reduce substantially all the selenate values to elemental selenium in from one to eight hours; and under these conditions using about 1 gram of thiourea for each 3 to 10 grams of selenate selenium, this can be accomplished in about one to three hours. Under these conditions, the elemental selenium product contains less than 1% and as little as .26% elemental sulfur.

As already indicated, the invention is advantageously used in connection with the recovery of selenium from an alkali slag containing alkali metal selenites and selenates. For best results in such use, the solidified slag is leached with an aqueous solution, preferably water, the leached solution is acidified with sufficient sulfuric acid to provide from 10 to 200 grams per liter of free acid, sulfur dioxide is then introduced into the acidified solution until all or substantially all of the selenite selenium values are reduced to elemental selenium. The thus precipitated selenium is then removed from the solution and the selenate values in the residual solution are then reduced to elemental selenium in the manner described herein. The selenium precipitated in this second precipitation step may be recovered as a product from the process. Preferably, however, when the selenate reduction step is practiced using thiourea alone as the reductant, or when the alkali slag is obtained from selenium-bearing by-products from a copper refinery, the process is repeated by incorporating the selenium product from the selenate reduction step into an alkali slag under controlled oxidation conditions to form a slag containing selenium values in the selenite and selenate state, preferably with the latter values present in unavoidably minimum amounts.

The invention is most advantageously practiced in connection with alkali slags obtained from a selenium-bearing material such as the slimes, sludges, anode muds and similar by-product materials from the electrolysis of selenium-bearing copper, by smelting such material with an alkaline compound of an alkali metal such as sodium hydroxide or sodium carbonate to form a molten alkali slag incorporating the selenium values from the material as an alkali metal compound of selenium. Preferably, the oxidation conditions in the molten slag, either during the smelting or in a separate apparatus, are controlled by adding to the slag appropriate amounts of a suitable oxidizing agent, for example sodium nitrate, and also, where desired or necessary, appropriate amounts of a suitable reducing agent, for example petroleum coke or other material capable of reducing selenates in the slag, to convert the selenium values in the slag to the selenite state with the formation of an unavoidable minimum amount of selenate selenium values.

In recovering the elemental selenium from such slags in accordance with the invention, the elemental selenium reduced in the selenate reduction step may be returned to an initial slag-containing selenium obtained from such copper electrolysis by-product material, either before or during the oxidation control step, or it may be treated separately to supply all of the selenium values in the molten slag. With such recycling the selenium obtained in the selenate reduction step, substantially all of the selenium values in the starting material is recovered in the selenite reduction step as a product which is comparatively free of elemental sulfur, tellurium, and arsenic and antimony values and which can be purified more readily to rectifier grade selenium.

The invention is further illustrated in the following examples. It should be understood, however, that the examples are given for purposes of illustration and that the invention in its broader aspects is not limited thereto.

EXAMPLE I

In this example a series of 18 test solutions were prepared, each containing 10 grams per liter of selenium as sodium selenate and 200 grams per liter of $H_2SO_4$. After heating each solution to the temperature indicated in Table 1, an amount of thiourea was added to each solution to provide the indicated grams of thiourea for each gram of selenate selenium in the solution calculated as Se. The mixture was stirred by hand until the thiourea was dissolved, after which each solution was covered and maintained at the indicated temperature for a period of one hour with occasional stirring. At the end of this period each solution was filtered to remove the elemental selenium, after which the filtrates and precipitates were analyzed. The results are set forth in Table 1.

Table 1

| Test No. | Temperature, °C. | Weight Ratio, Grams Thiourea per Gr. Se | Selenium in Filtrate, Grams Se per Liter | Selenium Removal, Percent | Sulfur in Precipitate, Percent |
|---|---|---|---|---|---|
| 1 | [1] 105 | 2.1 | 1.8 | 81 | |
| 2 | 105 | 2.5 | 0.3 | 97 | |
| 3 | 105 | 3.2 | <0.01 | >99.9 | |
| 4 | 90 | 0.95 | 6.4 | 39 | 38 |
| 5 | 90 | 1.0 | 5.1 | 49 | 31 |
| 6 | 90 | 1.9 | 3.7 | 65 | 46 |
| 7 | 90 | 2.9 | 0.4 | 96 | 56 |
| 8 | 90 | 3.7 | 0.01 | 99.9 | |
| 9 | 90 | 3.8 | <0.01 | >99.9 | 64 |
| 10 | 90 | 4.8 | <0.01 | >99.9 | 65 |
| 11 | 60 | 1.9 | 7.1 | 32 | |
| 12 | 60 | 4.8 | 1.9 | 82 | |
| 13 | 60 | 5.0 | 0.2 | 98 | |
| 14 | 60 | 6.0 | 0.3 | 97 | |
| 15 | [2] 28 | 1.9 | 7.0 | 33 | |
| 16 | 28 | 3.7 | 5.0 | 47 | |
| 17 | 28 | 4.8 | 3.4 | 68 | |
| 18 | 28 | 9.5 | 0.7 | 93 | |

[1] Solution boiling point.
[2] Room temperature.

It will be noted that at any given solution temperature the amount of selenium which is precipitated depends upon the amount of thiourea added to the solution. It will also be noted that for any given amount of thiourea the amount of precipitated selenium depends upon the solution temperature. It will be noted further that the amount of selenium which is precipitated increases with increased temperatures and increased amounts of added thiourea. In addition, it will be noted that more than 90% and as much as 99% and more of the selenate values in the solution can readily be reduced to elemental selenium and that residual solutions can readily be obtained which contain less than 0.2 gram per liter and as little as .01 gram per liter or less of selenate selenium values calculated as Se. Moreover, it will be noted from tests 1 through 3 that at least about 2.7 grams of thiourea for each gram of selenate selenium in the solution, calculated as Se, should be added to the solution to reduce substantially all of the selenate selenium therein to elemental selenium. It will also be noted from tests 4 through 10 that elemental sulfur is reduced in amounts proportional to the amount of elemental selenium obtained and that when substantially all of the selenate selenium in the solution is removed therefrom, the precipitate contains about 64% by weight of sulfur.

EXAMPLE II

The procedure in Example I was repeated but in this instance the temperature of all the solutions was maintained at 90° C. and different concentrations of sodium selenate were used in the solutions. The results obtained are set forth in Table 2.

Table 2

| Test No. | Selenium Content, Grams Se per Liter | Weight Ratio, Grams Thiourea per Gram Se | Selenium in Filtrate, Grams Se per Liter | Selenium Removal, Percent |
|---|---|---|---|---|
| 1 | 10.0 | 0.95 | 6.4 | 39 |
| 2 | 10.0 | 1.0 | 5.1 | 49 |
| 3 | 10.0 | 1.9 | 3.7 | 65 |
| 4 | 10.0 | 2.9 | 0.4 | 96 |
| 5 | 10.0 | 3.7 | 0.01 | 99.9 |
| 6 | 10.0 | 3.8 | <0.01 | >99.9 |
| 7 | 10.0 | 4.8 | <0.01 | >99.9 |
| 8 | 3.0 | 0.33 | 2.5 | 17 |
| 9 | 3.0 | 3.0 | 0.3 | 90 |
| 10 | 3.0 | 3.5 | <0.01 | >99.7 |
| 11 | 3.0 | 4.0 | <0.01 | >99.7 |
| 12 | 2.2 | 1.8 | 1.4 | 36 |
| 13 | 2.2 | 2.3 | 0.7 | 68 |
| 14 | 2.2 | 2.7 | 0.4 | 82 |
| 15 | 2.2 | 3.2 | 0.01 | 99.5 |
| 16 | 2.2 | 4.5 | <0.01 | >99.5 |
| 17 | 2.2 | 9.1 | <0.01 | >99.5 |
| 18 | 2.2 | 22.7 | <0.01 | >99.5 |
| 19 | 2.2 | 45.4 | <0.01 | >99.5 |
| 20 | 2.2 | 90.8 | <0.01 | >99.5 |

It will be noted that these results confirm those obtained in Example I. It will also be noted that the concentration of the selenate values in the initial solution has little, if any, effect upon the removal of such values from the solution.

EXAMPLE III

A solution containing 3.0 grams per liter of selenium as sodium selenate and 201.3 grams per liter of $H_2SO_4$ was prepared and heated to boiling. A quantity of thiourea amounting to 1.5 grams of thiourea for each gram of selenate selenium calculated as Se was added to the boiling solution. Boiling was continued for the time indicated in Table 3 and the evaporation losses were made up by periodic additions of distilled water. Samples of the solution were withdrawn at the periods indicated in the table, the withdrawn samples were filtered in a centrifuge and the selenium content of each of the filtrates was determined. The results obtained are set forth in Table 3.

*Table 3*

| Duration of Test Hours | Selenium in Sample, Grams Se per Liter | Selenium Removal, Percent |
|---|---|---|
| 1 | 1.3 | 57 |
| 2 | 1.2 | 60 |
| 4 | 1.2 | 60 |
| 6½ | 1.1 | 63 |

It will be noted that these results are in agreement with those obtained in Example I. It will be noted further that substantially all of the reduction of the selenate values to elemental selenium was accomplished in the first hour and that during this period substantially all of the added thiourea was consumed in such reduction.

EXAMPLE IV

The procedure in Example II was repeated. After the addition of the thiourea, each solution was maintained at 90° C. for the indicated period before the precipitated selenium was filtered from the solution. The results are tabulated in Table 4.

*Table 4*

| Test No. | Grams of Sodium Selenate per Liter, Calculated as Se | Weight Ratio, Grams of thiourea per Gram Se | Selenium Removal, Percent After One Hour | Selenium Removal, Percent After Two Hours |
|---|---|---|---|---|
| 1 | 10.0 | 1.9 | 65 | 72 |
| 2 | 3.0 | 1.0 | 35 | 43 |
| 3 | 3.0 | 2.5 | 79 | 83 |
| 4 | 3.0 | 3.0 | 90 | >99 |

It will be noted that these results confirm those obtained in Examples I and II. It will also be noted from a comparison of these results with those of the prior examples, particularly Example II, that with any given solution temperature, the amount of selenate selenium reduced increases as the time of the reduction period is increased and that at least about 2.7 grams of thiourea for each gram of selenate selenium calculated as Se should be added to the solution to enable substantially all of the selenate values therein to be reduced to elemental selenium.

EXAMPLE V

The procedure in Example I was repeated, using the solution temperatures and amounts of thiourea set forth in Table 5. The results were as follows:

*Table 5*

| Test No. | Weight Ratio, Grams Thiourea per Gram Se | Temperature, °C. | Selenium in Filtrate, Grams Se per Liter | Selenium Removal, Percent |
|---|---|---|---|---|
| 1 | 5.0 | 89 | <0.01 | >99.9 |
| 2 | 5.0 | 81 | <0.01 | >99.9 |
| 3 | 5.0 | 72 | <0.01 | >99.9 |
| 4 | 5.0 | 66 | 0.2 | 98 |
| 5 | 5.0 | 60 | 0.2 | 98 |
| 6 | 5.0 | 59 | 1.9 | 82 |
| 7 | 5.0 | 28 | 3.4 | 68 |
| 8 | 3.6 | 90 | 0.01 | 99.9 |
| 9 | 3.6 | 86 | 0.2 | 98 |
| 10 | 3.6 | 81 | 0.9 | 91 |
| 11 | 3.6 | 81 | 1.4 | 85 |
| 12 | 3.6 | 78 | 0.6 | 94 |
| 13 | 3.6 | 72 | 1.2 | 87 |
| 14 | 3.6 | 66 | 2.8 | 72 |
| 15 | 3.6 | 58 | 4.4 | 54 |
| 16 | 3.6 | 28 | 5.0 | 47 |
| 17 | 2.0 | 105 | 1.8 | 81 |
| 18 | 2.0 | 89 | 3.7 | 65 |
| 19 | 2.0 | 59 | 7.1 | 32 |
| 20 | 2.0 | 28 | 7.0 | 33 |

It will be noted from these results, as from those of Example I, that increased solution temperatures increase the rate of reduction of the selenate values. It will also be noted that the rate of increase of such reduction increases sharply as the solution temperature is increased above about 60° C.

EXAMPLE VI

The procedure in Example I was again repeated, using the solution temperatures, concentration of $H_2SO_4$ and the amount of thiourea indicated in Table 6, in which table the results obtained are also set forth.

*Table 6*

| Test No. | Weight Ratio, Grams Thiourea per Gram Se | Temperature, °C. | Sulfuric Acid, Grams per Liter | Selenium in Filtrate, Grams Se per Liter | Selenium Removal, Percent |
|---|---|---|---|---|---|
| 1 | 3.6 | 91 | 9.3 | 5.7 | 42 |
| 2 | 3.6 | 91 | 19.4 | 1.9 | 81 |
| 3 | 3.6 | 91 | 36.0 | 0.1 | 99 |
| 4 | 3.6 | 91 | 88.4 | Trace | >99.9 |
| 5 | 10.2 | 32 | 4.8 | 8.7 | 9 |
| 6 | 10.2 | 32 | 9.6 | 7.8 | 19 |
| 7 | 10.2 | 32 | 19.4 | 7.0 | 30 |
| 8 | 10.2 | 32 | 50.9 | 5.4 | 47 |
| 9 | 10.2 | 28 | 200 | --- | 93 |
| 10 | 10.2 | 50 | 4.8 | 8.0 | 17 |
| 11 | 10.2 | 50 | 9.6 | 7.4 | 23 |
| 12 | 10.2 | 50 | 19.4 | 6.1 | 39 |
| 13 | 10.2 | 50 | 50.9 | 2.7 | 74 |

It will be noted from these results that the rate of reduction of the selenate values increases as the concentration of the sulfuric acid in the solution is increased.

EXAMPLE VII

Two series of solutions containing 3 grams and 9.7 grams per liter of selenium as sodium selenate were prepared containing various amounts of sulfuric acid in the range of 9.7 to 200.5 grams per liter of $H_2SO_4$. Sulfur dioxide gas was introduced into the various solutions at constant rates in the range of 50 to 200 cc. of $SO_2$ per minute per liter of solution at standard conditions. Under these conditions one set of solutions was maintained at 85° C. and another at 58° C. while introducing the $SO_2$. No perceptible reduction in the selenium content was found in any of the solutions at any time.

EXAMPLE VIII

A series of solutions were prepared containing 3.0 grams per liter of selenium as sodium selenate and 200 grams per liter of sulfuric acid. The solutions were heated to 85° C. except where otherwise indicated in Table 8, after which gaseous sulfur dioxide was introduced into the solution through a fritted-glass gas dispersion tube at the rate of 200 cc. of $SO_2$ (at standard conditions) per minute per liter of solution for a period of ten minutes. Thereafter, thiourea dissolved in a minimum amount of water was added to the solution to provide the indicated amount of thiourea for each gram of selenate selenium in the solution calculated as Se. The above solution temperature and rate of introduction of the $SO_2$ were maintained for the period of time indicated in the table; losses in solution volume due to evaporation were periodically corrected by the addition of distilled water. Samples of the solution which were withdrawn periodically, as indicated, were filtered by centrifuging and the filtrate was analyzed for Se. From this analysis the percentage reduction of the selenate values to elemental selenium was calculated. The results obtained are set forth in Table 8.

*Table 8*

| Duration, Minutes | Ratio Grams Thiourea to Grams Se in Solution | | | | | |
|---|---|---|---|---|---|---|
| | 1:3 | 1:6 | 1:10 | 1:10 [1] | 1:15 | 1:30 |
| | Selenium Removal, Percent | | | | | |
| 15 | 70 | 57 | | | | |
| 30 | 87 | 70 | 47 | | 33 | 7 |
| 60 | 99.6 | 97 | 77 | 20 | 57 | 24 |
| 120 | >99.6 | 99.6 | 93 | 40 | 80 | 40 |
| 180 | | | [2] 99.4 | 53 | | 60 |
| 240 | | | | 67 | | 73 |
| 300 | | | | 77 | | 80 |
| 360 | | | | 83 | | 87 |
| 420 | | | | 87 | | 90 |
| 465 | | | | 90 | | [3] 93 |

[1] Temperature = 58±3° C.
[2] Precipitate contained 0.27% sulfur.
[3] Precipitate contained 0.26% sulfur.

It will be noted that the sulfur dioxide reduces substantially all of the selenate values even in the presence of minute quantities of thiourea. Moreover, it will be noted that the sulfur content of the selenium product is well below 1%. It will also be noted that the rate of reduction of the selenate values increases as the weight ratio of thiourea to selenate selenium calculated as Se is increased. It will be noted further that the rate of reduction of the selenate values increases with increased solution temperatures, particularly where the latter is above about 60° C.

The reason for the fact that a reducing agent such as sulfur dioxide, which by itself is incapable of reducing selenate values, will nevertheless effectively reduce such values in the presence of thiourea in the solution is not understood. While it is not desired to be bound by any particular theory, it is possible that thiourea has the role of a catalyst when used in combination with such reducing agents.

EXAMPLE IX

The procedure in Example VIII was repeated in a series of solutions containing 3.0 grams per liter of selenium as sodium selenate and an amount of thiourea corresponding to 1 gram of thiourea for each 3 grams of selenate selenium. The solution temperatures were maintained at 85° C. during the $SO_2$ addition; however, the various solutions contained different amounts of sulfuric acid as indicated in Table 9 which also sets forth the results obtained.

*Table 9*

| Duration, Minutes | Concentration of Sulfuric Acid, Grams per Liter | | | |
|---|---|---|---|---|
| | 200.5 | 97.7 | 46.2 | 9.7 |
| | Selenium Removal, Percent | | | |
| 15 | 70 | 73 | 50 | |
| 30 | 87 | 77 | 60 | |
| 60 | 99.6 | 93 | 70 = 7 | |
| 120 | >99.6 | 99.6 | 97 | 20 |
| 180 | | | | 63 |
| 300 | | | | 87 |
| 420 | | | | 96 |
| 465 | | | | 97 |

It will be noted that substantially all of the selenate selenium values in the solution were reduced in each instance. It will be noted further that the rate of reduction increased as the acidity of the solution was increased.

EXAMPLE X

The procedure in Example IX was repeated. In this instance, however, each solution contained 200 grams per liter of $H_2SO_4$ but the rate of introduction of the $SO_2$ was varied as indicated in Table 10, which table also includes the results obtained.

*Table 10*

| Duration, Minutes | Gassing Rate, cc. of Sulfur Dioxide at Standard Conditions per Minute per Liter of Solution | | | | | |
|---|---|---|---|---|---|---|
| | 50 | | 100 | | 200 | |
| | Selenium in Filtrate, Grs. Se per Liter | Selenium Removal, Percent | Selenium in Filtrate, Grs. Se per Liter | Selenium Removal, Percent | Selenium in Filtrate, Grs. Se per Liter | Selenium Removal, Percent |
| 15 | 2.0 | 33 | 0.9 | 70 | 0.9 | 70 |
| 30 | 1.5 | 50 | 0.2 | 93 | 0.4 | 87 |
| 60 | 0.1 | 97 | 0.1 | 97 | 0.01 | 99.6 |
| 120 | 0.1 | 97 | 0.01 | 99.6 | 0.01 | 99.6 |
| 145 | 0.01 | 99.6 | | | | |

It will be noted that in the early stages of the reduction the rate of reduction of the selenate values increases as the rate of introduction of the $SO_2$ was increased. It will also be noted that rate of introduction of the $SO_2$ has only a small effect upon the time required to reduce substantially all of the selenate values in the solution.

EXAMPLE XI

Two 500 cc. solutions were prepared, each containing 200 grams per liter of $H_2SO_4$ and 1.5 grams of selenium as sodium selenate. 0.5 gram of thiourea dissolved in a minimum amount of water was added to the first solution after the latter had been heated to 90° C. Thereafter the solution was maintained at this temperature for one hour while stirring the solution intermittently. At the end of this period the solution was filtered and the precipitate was washed and dried. 0.22 gram of dry precipitate containing 28.1% sulfur and 71.8% elemental selenium were obtained. The filtrate was reheated to 85° C. and $SO_2$ gas was introduced therein at the rate of 200 cc. per minute for a period of two hours while maintaining the solution temperature at 85° C. At the end of this period the solution was filtered and the precipitate was washed and dried. 1.13 grams of precipitate were obtained which contained 1.57% sulfur and 96% elemental selenium.

The second solution was heated to 85° C. and maintained at this temperature. Gaseous $SO_2$ was then introduced into the solution at a rate of 200 cc. per minute for a period of ten minutes, after which 0.5 gram of thiourea dissolved in a minimum amount of water was added to the solution and thereafter the addition of the $SO_2$ was continued for a period of two hours. At the end of this period, the solution was filtered and the precipitate was washed and dried. 1.43 grams of dried precipitate were obtained which contained 0.43% sulfur and 99.5% elemental selenium. The filtrate was found to contain less than 0.01 gram per liter of selenium values calculated as Se.

It will be noted that introduction of the $SO_2$ before or simultaneously with the thiourea permits a somewhat more efficient use of the latter. It will also be noted that sulfur content of the selenium product from the second solution was lower than that obtained from the first solution.

EXAMPLE XII

The invention was practiced over a period of several months on a plant-size scale in connection with alkali slags containing alkali metal selenite and selenates together with various amounts of tellurium, arsenic and antimony values. The slags were obtained by smelting selenium - tellurium - arsenic - antimony - bearing slimes, sludges and anode muds from an electrolytic copper refining, with sodium carbonate to form an alkali slag incorporating the selenium values from such material. The oxidation conditions in the slag were controlled to convert the selenium values therein to sodium selenite with a minimum amount of sodium selenate by adding to the slag an oxidizing agent such as sodium nitrate and, where required or desired, a reducing material such as coke or other suitable reducing agent.

The molten slag was solidified and then crushed and ground. The dissolved slag was then leached with water and acidified with sulfuric acid to a pH in the range 6 to 7 to precipitate as much as possible of the tellurium therefrom. Thereafter the solution was filtered and additional sulfuric acid added to the filtrate to provide 150 to 200 grams per liter of $H_2SO_4$ therein. $SO_2$ gas was then bubbled through the thus acidified solution until substantially all the selenite values therein were precipitated as elemental selenium which was then filtered from the solution and recovered. This recovered product was readily and easily purified to a highly pure selenium product by conventional method.

The filtrate which contained the unreduced selenate selenium values typically contained about 1 to 5 grams per liter and generally about 1.5 grams per liter of selenium values calculated as Se, about 150 grams per liter of $H_2SO_4$ together with various amounts of tellurium, arsenic and antimony values. Each of the filtrates obtained over the period was heated to 85 to 90° C., thiourea in amounts less than 2.7 grams of thiourea for each gram of dissolved selenium calculated as Se was added thereto while introducing gaseous $SO_2$. The introduction of the $SO_2$ was continued while maintaining the solution temperature at about 85 to 90° C. until substantially all of the selenate values were reduced to elemental selenium, which usually was accomplished in a period of about one to two hours. The solutions were then filtered and the precipitate washed. The filtrate typically contained less than 0.01 gram per liter selenium values calculated as selenium.

In addition to elemental selenium and sulfur in various amounts, depending upon the amount of thiourea used, the various precipitates also typically contained various amounts of tellurium, arsenic and antimony values. As such, it was not advantageous to subject them directly to conventional purification procedures. The process was repeated, using the precipitates as such or in conjunction with selenium-bearing slimes, sludges and anode muds to obtain an alkali slag. The selenium product obtained in the selenite precipitation step was found to be similar to the normal product obtained in this step and was readily and easily purified to rectifier grade selenium by conventional procedures.

What is claimed is:

1. In a process for recovering elemental selenium from an alkali slag containing selenites and selenates of an alkali metal involving leaching said slag to dissolve said selenium values therefrom, acidifying the leach solution with sulfuric acid, introducing sulfur dioxide into the acidified solution to reduce the selenite values therein to elemental selenium, and recovering the latter from the solution, the improvement which comprises reducing selenate values remaining in the residual acid solution from said selenite reduction step to elemental selenium in the presence of thiourea in said residual solution, recovering the thus precipitated elemental selenium from said residual solution, incorporating said last mentioned elemental selenium into a molten alkali slag, controlling the oxidation conditions in the latter to convert the selenium values therein to values comprising an alkali metal selenite, and repeating said selenite reduction step and the recovery of the elemental selenium precipitated therein.

2. A process according to claim 1 in which thiourea alone is the reductant in said selenate reduction step.

3. A process according to claim 2 in which thiourea in amounts corresponding to at least 2.7 grams for each gram of selenate selenium values calculated as Se contained in said residual solution is added thereto, said residual solution contains about 10 to 200 grams per liter of sulfuric acid, and the temperature of said residual solution is maintained in the range of about 60° C. and the solution boiling point until substantially all of the selenate values in said residual solution are reduced to elemental selenium.

4. A process according to claim 1 in which thiourea and sulfur dioxide are the reductants in said selenate reduction step.

5. A process according to claim 4 in which said residual solution contains about 40 to 200 grams per liter of sulfuric acid, the temperature of said solution is maintained in the range of about 60° C. and the solution boiling point, thiourea in amounts of about 1 gram of thiourea for each 3 to 30 grams of selenate selenium values calculated as Se contained in said residual solution is added thereto while introducing gaseous sulfur dioxide into the solution, and the introduction of sulfur dioxide into the residual solution is continued until substantially all of the selenate selenium values therein are reduced to elemental selenium.

6. In a process for recovering selenate selenium values contained in a sulfuric acid solution, the improvement comprising reducing such values to elemental selenium in the presence of thiourea in the solution, and recovering the elemental selenium from the solution.

References Cited in the file of this patent
UNITED STATES PATENTS

| | | |
|---|---|---|
| 1,730,681 | Ogden et al. | Oct. 8, 1929 |
| 1,915,703 | Towne et al. | June 27, 1933 |
| 1,945,074 | Ralston et al. | Jan. 30, 1934 |
| 2,349,697 | Bierly | May 23, 1944 |

OTHER REFERENCES

Chemical Review, vol. 36, pages 254 and 262, February 1945.